Oct. 2, 1956    G. T. CHURCH    2,764,959
ELECTRICALLY HEATED AIR CONNECTION INCUBATOR
Filed Nov. 29, 1952    2 Sheets-Sheet 1

Inventor
GEORGE THOMAS CHURCH

Oct. 2, 1956  G. T. CHURCH  2,764,959
ELECTRICALLY HEATED AIR CONNECTION INCUBATOR
Filed Nov. 29, 1952  2 Sheets-Sheet 2
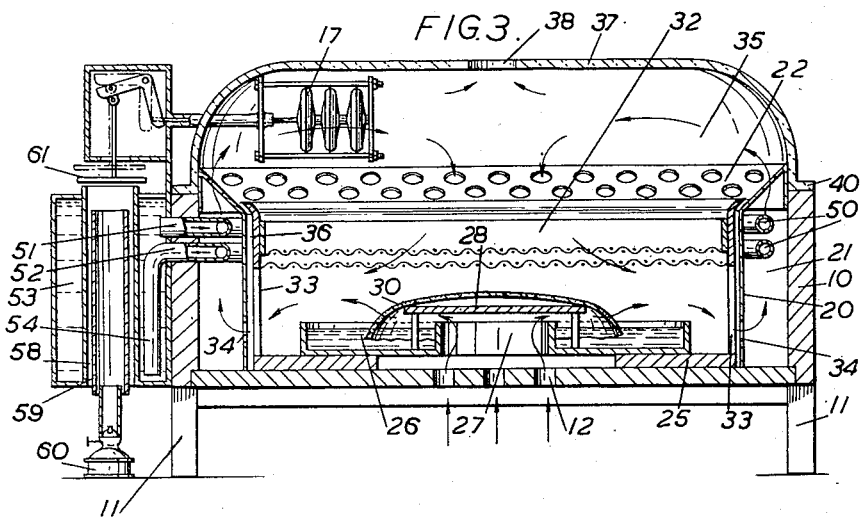
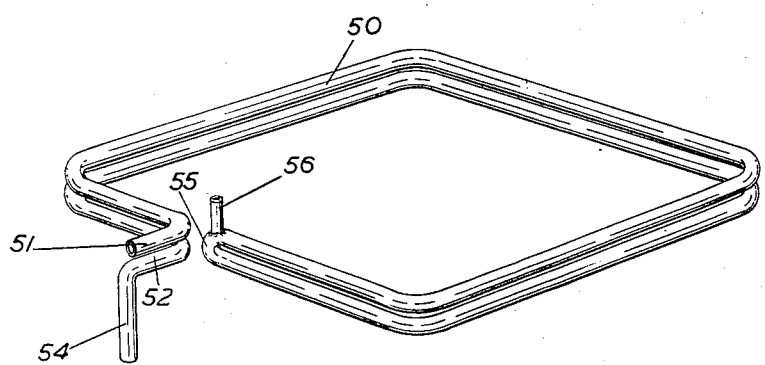
Inventor
GEORGE THOMAS CHURCH

2,764,959

ELECTRICALLY HEATED AIR CONNECTION INCUBATOR

George Thomas Church, Chertsey, England

Application November 29, 1952, Serial No. 323,266

Claims priority, application Great Britain December 14, 1951

4 Claims. (Cl. 119—37)

This invention relates to incubators.

According to the invention an incubator comprises a casing, a heating device within and adjacent the walls of the casing, inner walls within the casing spaced from the heating device to provide air channels, said walls having holes therein for the passage of air, and means to support an egg tray and a water tray within the space enclosed by said walls.

The incubator preferably has a removable transparent cover on the casing and this may be a one-piece moulded dome-shaped member having rectangular lower edges corresponding to the shape of the casing.

This arrangement provides for adequate circulation of heated air through the egg trays, and a clear transparent cover whereby the eggs and the hatching may be clearly seen at all times during the incubation.

The invention will now be further described by way of example with reference to the accompanying diagrammatic drawings wherein:

Figure 3 is a similar vertical sectional view but showing a modified form of heating device; and Figure 4 is a detail part of Figure 3 to be described.

Figure 1:
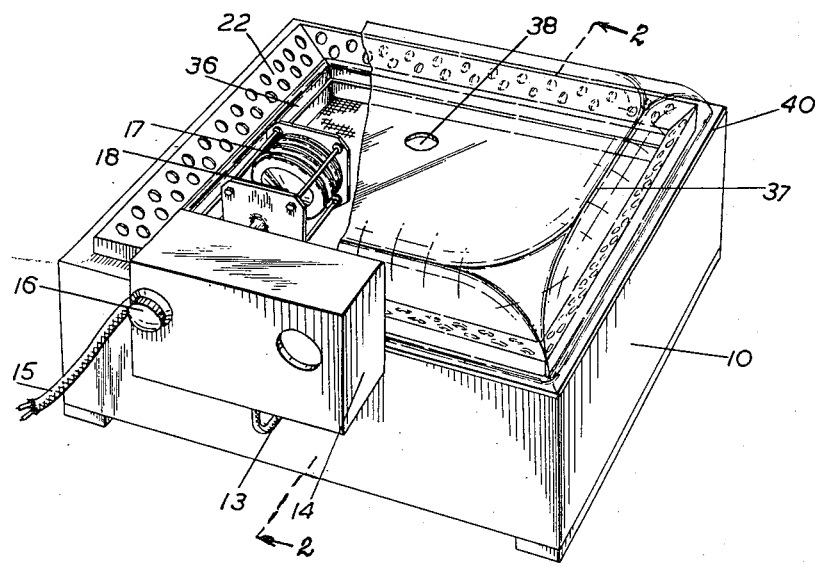
Figure 1 is a perspective view of an incubator made in accordance with the invention.
Figure 2:
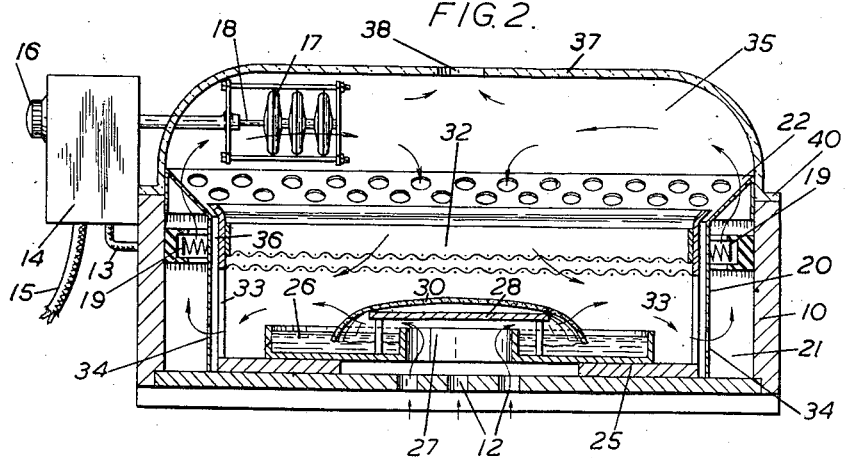
Figure 2 is a vertical sectional view taken along line 2—2 of Fig. 1.

The casing 10 is a rectangular open-topped casing made of wood, metal or other suitable material having upright side walls with supports 11 and air inlet holes 12 in the bottom wall or floor. The heating device shown in Figure 2 is in the form of an electrical resistor element 19 embedded in or wound on an insulating material or carried on insulators and extending around all four sides of the casing, and connected by a lead 13 to a control device 14 which is connected to an electric mains supply by a lead 15. The current fed to the element is adjustable by hand control 16 and also automatically by thermostat 17 connected by a rod 18 to the device 14. Inner walls 20 together constituting a rectangular frame are mounted upon the floor of the casing and spaced a short distance from the heater device to provide an open-topped compartment 21 around all four sides of the casing. This compartment is covered with a perforated top wall or frame 22 to prevent chicks from getting into this compartment. The frame is attached at its inner edges to the walls 20 and extends upwardly and outwardly therefrom so that the perforated frame is at an angle of about 45° to prevent chicks from lying on the frame and so preventing air and heat circulation. The floor of the casing 10 carries supports 25 for an annular water tray 26 having a central hole 27 through which air passes upwards from the holes 12. The central hole 27 is covered by a plate 28 which may be perforated and this plate is covered by a sheet 30 of canvas the edges of which dip into the water so that the air will be adequately moistened. An egg tray 32 is mounted on legs 33 at about the same level as the heater element 19 at the upper part of the compartment 21. The moistened air passes through holes 34 in the lower part of the walls 20 below the level of the egg tray, up the compartment 21, through the perforations in the top frame 22 into a space 35 above the egg tray, down through the egg tray, and again through the apertures 34, thereby providing a continuous circulation. The egg tray is retained in position by a spacer wall 36 which rests on support 25 and is sufficiently spaced from the walls 20 to avoid direct heating of the tray by said inner walls 20. The holes 12 may be adjustable as to size to control the humidity.

The space 35 is enclosed by a transparent cover 37 having an opening 38 for air ventilation the air escaping through this opening being replenished by entry of air through the holes 12. The cover 37 is a one-piece moulded member made from a suitable transparent plastics material or glass. It has its lower edges rectangular corresponding to the shape of the casing so as to seat on the upper edges of the casing, and has a narrow annular flange 40 for strengthening purposes. The cover is dome shaped so as to provide unrestricted view of the egg tray. The only opaque part which is above the egg tray is the thermostat 17. The cover resembles a box open at the bottom and thus provides adequate space 35 for the air and for the chicks.

In the modified construction shown in Figures 3 and 4 the heating device is in the form of a water pipe 50 having its entrance and exit parts or ends 51, 52 adjacent each other and extending through the casing 10 into a water tank 53. The end 51 is at the upper part of the tank and the end 52 has an extension 54 dipping down nearly to the bottom of the tank. The pipe is bent around the casing in upper and lower levels with the bent end 55 provided with an air escape tube 56. The tank 53 has a central hole 58 containing the chimney 59 of an oil or gas burner 60. The central hole 58 has a damper plate 61 above it the height of which is adjustable by the thermostat 17 to vary the size of the air vent between the top of the hole 58 and the plate 61. The heated water enters the pipe at 51 and circulates around the upper part of the pipe and returns through the lower part of the pipe. This arrangement of the pipe provides substantially the same degree of heat at all parts around and within the compartment 21.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An incubator comprising a casing having a base and upright side walls extending from said base, an inner wall disposed within said casing and extending along said side walls but spaced therefrom to thereby define an air channel, heating means provided in the upper part of said air channel and located between said inner wall and said upright side walls, a spacer wall supported by said base, an egg tray disposed on and supported by said spacer wall and spaced by the latter out of contact with said inner wall and said inner wall terminating in a slanted perforated top wall overlying said air channel, the distance between said upright walls and said inner wall being greater than the distance between the latter and said spacer wall, a cover for closing said casing and defining a first chamber above said egg tray, at least one air inlet provided in said base, a second chamber provided below said tray and centrally disposed with respect to said inner wall and bounded by the latter, and humidifying means centrally disposed adjacent said base and within said second chamber and spaced from said inlet, said spacer wall removably supporting said egg tray adjacent the upper part of said inner wall and said heating means, said inner wall being provided with at least one opening in the lower part of said air channel and forming a passageway for air coming from said inlet and said humidifying means to direct said air through said opening into said air channel, said cover being provided with an escape hole for air passing through said perforated top wall, said first and second chambers being in direct communication with each other through said egg tray.

2. An incubator as claimed in claim 1, wherein said top wall extends from the upper edges of said inner wall upwardly and outwardly to cover the air channel between said inner wall and said upright walls of the casing and to surround said egg tray.

3. An incubator as claimed in claim 1, wherein said opening in the inner wall is located approximately level with the position of said humidifying means, said inner wall being imperforate at a location between said heating means and said egg tray.

4. An incubator as set forth in claim 1, said heating means comprising a water pipe provided with entrance and exit parts located adjacent each other, a tank positioned outside said casing and in communication with said parts, said pipe passing exteriorly around the casing at upper and lower levels, respectively, and being provided with a connecting bend extending between said upper and lower levels of said pipe and located adjacent both said entrance and said exit parts.

References Cited in the file of this patent

UNITED STATES PATENTS

| | | |
|---|---|---|
| 678,053 | Skinner | July 9, 1901 |
| 1,410,065 | Keller | Mar. 21, 1922 |
| 1,424,821 | Heck | Aug. 8, 1922 |
| 2,566,453 | Ketay | Sept. 4, 1951 |